Feb. 11, 1969   H. HOOCK   3,427,045
TOWING DEVICE

Filed June 16, 1967   Sheet 1 of 2

INVENTOR.
HERBERT (N) HOOCK
BY
Dunlap and Hanny
ATTORNEYS

United States Patent Office 3,427,045
Patented Feb. 11, 1969

3,427,045
TOWING DEVICE
Herbert Hoock, Box 72, Corn, Okla. 73024
Filed June 16, 1967, Ser. No. 646,674
U.S. Cl. 280—478    11 Claims
Int. Cl. B60d 1/14, 1/00

ABSTRACT OF THE DISCLOSURE

A device for interconnecting towed and towing vehicles including brackets adapted to be secured to opposite sides of the towed vehicle. The brackets include movable links adapted for detachable connection to legs of a generally V-shaped connecting frame which has a clevis secured to the convergent ends of the legs. One of the legs is pivotably secured to the clevis so that the legs can be brought into juxtaposition and substantial parallelism when the connecting frame is disconnected from the movable links of the brackets and is thus not in use. A latching device is provided on each of the brackets so that when a towing force is exerted thereon through the connecting frame, the movable links are securely latched in an extended towing position until manual release of the latching devices.

Background of the invention

*Field of the invention.*—This invention relates to towing devices and hitches, and particularly, to towing devices of the type used to interconnect towing and towed land vehicles.

*Brief description of the prior art*

Various types of hitches or towing devices for interconnecting trailers and the like to a towing vehicle are now marketed. In some of these devices, a forwardly protruding towing frame is made a permanent or semi-permanent portion of the towed vehicle, decreasing flexibility of utilization of the towed vehicle, and increasing the total space required for its storage and maneuvering. In other towing devices, though the towing frame can be connected or disconnected from the towed vehicle without great difficulty, the connection, once made is a rigid one, and thus necessitates moving and shifting the entire towed vehicle as the forward end of the towing frame is properly positioned for connection to the towing vehicle. Many of the types of hitches heretofore in use have been bulky and not susceptible to convenient storage in confined spaces, such as in the trunk of the towing vehicle.

*Brief description of the present invention*

The present invention is a towing device which has none of the described disadvantages characterizing many presently marketed hitches. The towing frame may be quickly and easily connected and disconnected from both the towed and towing vehicles by a single person, and when initially engaged with the towed vehicle, is connected through a yieldable connection which reduces the difficulty of aligning it properly with the towing vessel for connection thereto.

Broadly described, the towing device of the present invention comprises a pair of bracket elements adapted to be secured to a vehicle at horizontally spaced points on such vehicle, the bracket elements each including movable links mounted in the bracket for pivotal movement about substantially horizontal axes, and further including latching means for latching the respective links in a towing position. A towing or connecting frame is provided which includes a pair of legs each connected at one end to a clevis adapted to be connected to the towing vehicle by a pin or other suitable connecting element. In a preferred embodiment of the invention, one of the legs of the connecting frame is pivotally connected to the clevis so that it can be pivoted from a towing position, in which it diverges from the other leg of the towing frame, to a storage position in which it is in juxtaposition, and extends parallel, to the other leg.

An object of the invention is to provide an improved towing device which can be quickly and easily connected to, or disconnected from, a towed and towing vehicle.

Another object of the invention is to provide a hitch apparatus for interconnecting two vehicles, with the hitch apparatus being initially connected to one of the vehicles through a flexible connection, and operable to automatically form a semi-rigid connection with said one vehicle when said vehicles are moved apart to place said hitch apparatus in tension.

A further object of the invention is to provide a towing device which can be folded to a compact status for storage and transport when not in use.

Another object of the invention is to provide a mechanically simple and economically constructed towing device which has a long and trouble free operating life.

Additional objects and advantages of the invention will become apparent as the following detailed description of the invention is considered in conjunction with the accompanying drawings which illustrate the invention.

Figure 1:
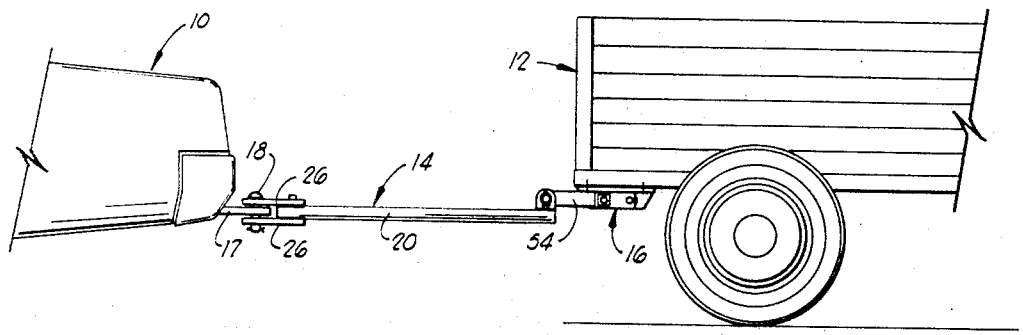
FIGURE 1 is a view in elevation illustrating the towing device of the present invention as it appears when interconnected between a towing vehicle and a towed vehicle.

Brief description of preferred embodiments of the invention

In referring to the drawings, reference numerals associated with lead lines having arrowheads thereon will be used to designate broad combinations of the structure used in the towing device of the invention, which broad combinations include a plurality of subcombinations or individual elements. The use of plain lead lines without arrowheads will be employed to designate individual structural elements making up parts of broad combinations of structure.

Referring initially to FIGURE 1 in the drawings, a towing vehicle, such as an automobile 10, is depicted as connected through the towing device of the present invention to a towed vehicle, such as a trailer 12. The towing device of the present invention used to interconnect the towing and towed vehicles includes a towing or connecting frame designated generally by reference character 14 and a pair of bracket elements designated generally by reference character 16 (see FIG. 2). The forward end of the towing frame 14 is secured to the automobile 10 by means of a towing plate 17 and a suitable post or pin 18 in a manner hereinafter described in greater detail.

Figure 2:
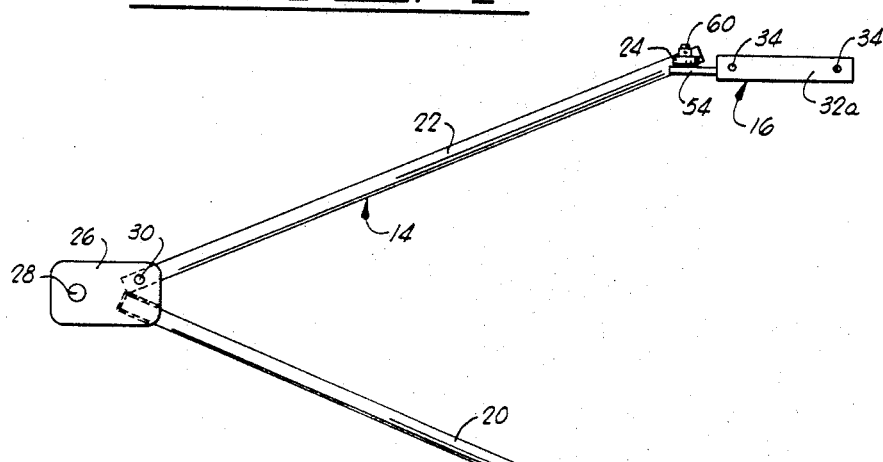
FIGURE 2 is a plan view of the towing device of invention.
Figure 3:
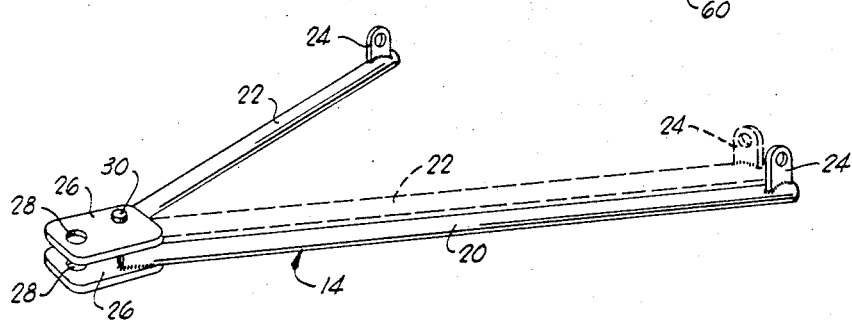
FIGURE 3 is a perspective view of the towing or connecting frame used in the towing device of the invention with the towing position of this frame illustrated in full lines, and the collapsed or storage position of the frame illustrated by showing in dashed lines the position then occupied by one of the legs of the frame.
Figure 4:
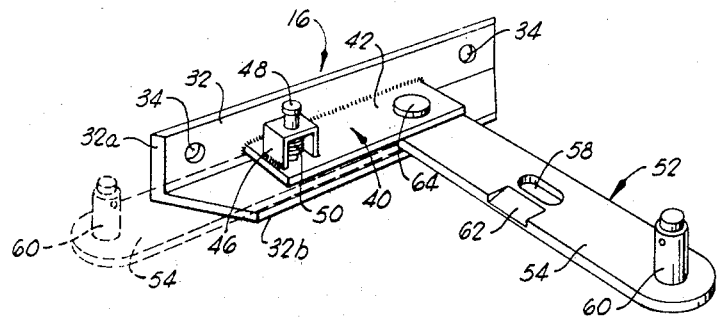
FIGURE 4 is a perspective view illustrating one of the brackets utilized in conjunction with the towing or connecting frame in the towing device of the invention.

The details of construction of the towing device of the invention are best illustrated in FIGURES 2-7. In referring to FIGURE 2, it will be noted that the connecting frame 14 includes a pair of elongated legs 20 and 22 which may suitably be tubular members. The elongated legs 20 and 22 each carry at one of their ends, an apertured connecting plate 24. The apertured connecting plates 24 are each welded or otherwise suitably secured to their respective legs 20 and 22 at an angle with respect to the longitudinal axis of the respective leg so that when the legs are placed in a position of divergency from each other, as depicted in FIGURE 2, the apertured connecting plates 24 extend substantially parallel to each other, and are positioned for connection to the bracket elements 16 in a manner hereinafter described.

The elongated leg 20 is rigidly secured at its end opposite the apertured connecting plate 24 between a pair of clevis plates 26 which together form a clevis enabling the connecting frame 14 to be connected by a pin or other suitable connecting device to a towing vehicle. In furtherance of this function, each of the clevis plates 26 is provided with an aperture 28 and the apertures are vertically aligned to permit a connecting pin 18 to be passed therethrough, in the manner depicted in FIGURE 1. The elongated leg 22 is pivotally secured between the clevis plates 26 by means of a pivot pin 30 which is passed through a mating aperture or hole formed in the end of this elongated leg. Thus, the elongated leg 22 can be pivoted about a substantially vertical axis and can be moved from the position in which it is illustrated in full lines to the position in which it is illustrated in dash lines in FIGURE 3. The pivotal securement of the elongated leg 22 to the clevis formed by the clevis plates 26 permits the connecting frame 14 to be collapsed or folded to a compact status for the purposes of storage when not in use.

Figure 5:
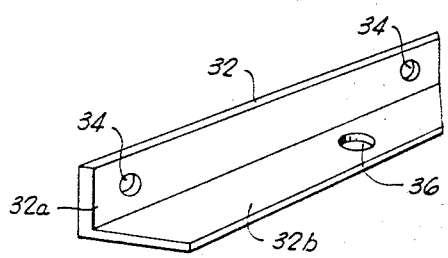
FIGURE 5 is an enlarged perspective detail view illustrating a portion of the bracket depicted in FIGURE 4.

The construction of the bracket elements 16 utilized in conjunction with the connecting frame 14 in the towing device of the invention is best illustrated in FIGURES 4-7. In referring to these figures of the drawings, it will be noted that each of the bracket elements 16 includes a mounting plate 32 which may suitably be in the form of an angle iron structure having legs 32a and 32b disposed at right angles to each other, with a pair of bolt holes 34 formed in the leg 32a of the mounting plate. The leg 32b of the mounting plate 32 also has a relatively large aperture 36 formed therein as depicted in FIGURE 5.

Figure 6:
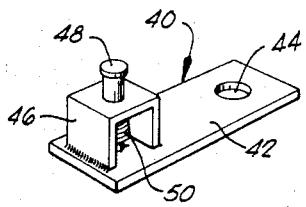
FIGURE 6 is an enlarged perspective detail view illustrating the latching means forming a portion of the bracket depicted in FIGURE 4.
Figure 7:
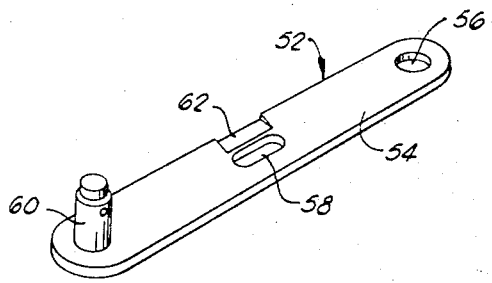
FIGURE 7 is an enlarged perspective detail view showing one of the movable links used in the bracket depicted in FIGURE 4.

A second subcombination included in each of the brackets 16 is a latching device designated generally in FIGURE 6 by reference numeral 40. The latching device 40 includes a plate member 42 having an aperture 44 formed therethrough adjacent one end of the plate member, and a generally U-shaped locking pin supporting element 46 secured to one surface of the plate member 42 at the opposite end thereof from that which contains the aperture 44. A latch pin 48 extends through the U-shaped pin supporting element 46, and also through the plate member 42 to the opposite side thereof from the pin supporting element 46. A helical spring element 50 is positioned within the U-shaped pin supporting element 46 and is connected to the latch pin 48. As a final element of each of the bracket elements 16, a movable connecting link 52 is provided, and includes an elongated link plate 54 having an aperture 56 adjacent one end thereof, a pin slot 58 near the center thereof, and a frame engaging pin 60 secured to the end of the link plate 54 opposite the end which carries the aperture 56. The link plate 54 is cutaway or relieved at one of its edges near the center of the link plate to provide a beveled surface 62 which is transversely aligned with the pin slot 58.

In the assembly of each of the bracket elements 16, the plate member 42 of the latching device 40 is welded along one of its edges to the leg 32a of the mounting plate 32 so as to extend parallel to, and be spaced from, the leg 32b. A space or channel is thus formed between the plate member 42 and the leg 32b of the mounting plate 32. It will further be noted that the aperture 44 in the plate member 42 is aligned with the aperture 36 in the leg 32b of the mounting plate 32. With the latching device 40 thus secured to the mounting plate 32 in the described position, the movable connecting link 52 is pivotally connected between the latching device 40 and the leg 32b of the mounting plate 32 by extending a suitable bolt or rivet 64 through the apertures 36, 56 and 44 formed in the leg 32b, the elongated link plate 54, and the plate member 42, respectively. With the movable connecting links 52 secured in each of the bracket elements 16 in this manner, each connecting link 52 can pivot from the full line position illustrated in FIGURE 4, hereinafter referred to as the connecting position, to the dash line position illustrated in FIGURE 4, hereinafter referred to as the towing position.

When each of the bracket elements 16 has been made up or fabricated in a manner described, the bracket elements 16 are secured to the frame of the trailer 12 or other vehicle to be towed by securing the bracket elements 16 to the underside of the frame on the opposite sides of the trailer adjacent the forward end thereof. It will be noted in referring to FIGURES 1 and 2 that the bracket elements are secured to the frame of the trailer 12 so that the leg 32a of the mounting plate 32 faces upwardly and may be secured by bolts or other suitable fastening elements to the frame of the trailer. The securement of the bracket elements 16 to the frame of the trailer 12 is effected so that each of the latching devices 40 faces outwardly, and the pins 60 also face outwardly.

When the bracket elements 16 have been secured in the proper position on the trailer 12, the trailer may then be secured to a towing vehicle by interconnecting the connecting frame 14 between the bracket elements 16 and a towing vehicle, such as the automobile 10 depicted in FIGURE 1. This interconnection is accomplished by opening the elongated leg 22 of the connecting frame 14 outwardly to a position of divergence from the elongated leg 20 in which the connecting plates 24 extend substantially parallel to each other. In this position, the frame engaging pins 60 carried by the movable connecting links 52 may be passed through the apertures or holes provided in the apertured connecting plates 24 and secured in this position by nuts, cotter keys or other suitable retaining elements. It will be noted that the ease with which the connecting frame 14 may be connected to the bracket elements 16 is facilitated by the ability of the connecting links 52 to swing or pivot about the bolts 64. After connecting plates 24 have been secured to the frame engaging pins 60, the forward end of the connecting frame 14 which carries the clevis formed by the clevis plates 26 is brought into alignment with a suitable aperture provided in the towing plate 17 carried by the automobile 10. The towing pin 18 is then passed through the apertures or holes 28 provided in the clevis plates 26 to engage the clevis with the automobile. It should be noted at this point that one of the important features of the invention is the freedom of movement characterizing the clevis of the connecting frame 14 as a result of the connection of the elongated legs 20 and 22 to the bracket elements 16 through the flexible connection afforded by the movable connecting links 52. Thus, it is not necessary to bodily jockey the trailer 12 about in bringing the apertures 28 through the clevis plates 26 into proper alignment with the towing plate on the automobile 10 since the movable connecting links 52 can yield to permit vertical as well as horizontal movement of this portion of the connecting frame.

After the connecting frame 14 has been interconnected between the towing automobile 10 and the trailer 12, towing of the trailer can be commenced. As the automobile commences to move forward, a forward pulling force is exerted through the elongated legs 20 and 22 of the connecting frame 14 upon the movable connecting links 52, pivoting these links to the towing position illustrated in FIGURE 1 of the drawings, and further illustrated by dash lines in FIGURE 4 in the drawings. When the movable connecting links 52 move into the towing position, the latch pins 48 are forced outwardly against the bias of the springs 50, and the ends of the latch pins 48 which contact the respective connecting links 52 ride over the beveled surfaces 62. As the connecting links 52 move into the final towing position in which the upper edge of each of the connecting links abuts the lower surface of the leg 32a of the mounting plate 32, the respective latch pin 42 snaps into the pin slot 58, locking the movable connecting link 52 in its towing position. The links 52 are thus constrained to remain in this towing position until such time as the tow is completed.

Upon completion of the tow, the towing device of the present invention may be easily disconnected from the automobile 10 and trailer 12 by initially manually retracting the latch pins 48 against the bias of the springs 50 to withdraw the latch pins from the pin slots 58 in the elongated link plates 54. A slight downward pressure on the connecting frame 14 will then completely disengage the movable connecting links 52 from the latching devices 40 of each of the bracket elements 16. Freedom of movement of the forward end of the connecting frame 14 thus again becomes possible, rendering the disconnection of the clevis formed by the clevis plates 26 from the automobile easily and quickly accomplished. When the connecting frame 14 has been disconnected from the bracket elements 16, and from the towing vehicle, the connecting frame can be collapsed to a compact status in which it occupies relatively little space by pivoting the elongated leg 22 to the dash line position shown in FIGURE 3 of the drawings. In this status, the connecting frame 14 can be easily stored in the trunk of the automobile, or in any other convenient location until such time as it is desired to again use it for towing.

From the foregoing description of the invention, it will have become apparent that the present invention provides a highly useful, yet relatively simple and economically constructed, towing device which can be used for interconnecting two vehicles for towing purposes. The towing device can be quickly and easily connected between the towing and towed vehicles and, when not in use, can be collapsed to a compact status for purposes of storage or transport.

Although a preferred embodiment of the invention has been herein disclosed in order to provide an example of the manner in which the invention can be practiced, it will be appreciated that various changes and innovations involving departures from the precise structure illustrated in the drawings and described in the specification can be effected without significant departure from the basic principles of the invention.

What is claimed is:
1. A towing device comprising:
   a pair of bracket elements each individually adapted for attachment to opposite sides of a towed vehicle and each including a movable link for pivoting about a substantially horizontal axis; and
   a connecting frame comprising
      a pair of elongated legs each having first and second ends and each having its first end swingably connected to one of said movable links for pivoting about a substantially horizontal axis; and
      a clevis connected to the second ends of said elongated legs and adapted for connection to a towing vehicle.

2. A towing device as defined in claim 1 wherein said legs are movable relative to each other from a divergent first position in which said connecting frame is of a generally V-shaped configuration, to a second position in which said legs extend substantially parallel to each other.

3. A towing device as defined in claim 1 wherein each of said bracket elements further includes latching means for locking the movable link of the respective bracket element in a towing position.

4. A towing device as defined in claim 1 wherein said clevis comprises a pair of substantially parallel plates immovably secured to the opposite sides of one of said elongated legs, and pivotally secured to the other of said elongated legs, said plates having a pair of aligned apertures therethrough.

5. A towing device as defined in claim 1 and further characterized to include an apertured connecting plate secured to the first ends of said elongated legs; and wherein each of said movable links includes an engaging pin engaged with one of said apertured connecting plates.

6. A towing device as defined in claim 3 wherein each of said bracket elements comprises:
   a mounting plate secured to said latching means and adapted to be secured to the frame of the towed vehicle; and
   pivot means pivotally securing said movable links in the respective bracket element for pivoting about a substantially horizontal axis.

7. A towing device as defined in claim 6 wherein said mounting plate is an angle iron structure having first and second portions extending at substantially a right angle to each other, and said latching means comprises:
   a plate member secured to said second portion of said mounting plate and spaced from, and extending substantially parallel to, said first portion;
   a U-shaped pin supporting element secured to said plate member on the opposite side thereof from the first portion of said mounting plate;
   a latch pin extending through said plate member and through said U-shaped pin supporting element; and
   a spring resiliently biasing said latch pin partially through said plate member toward said first portion of the mounting plate.

8. A towing device as defined in claim 7 wherein each of said movable links comprises a link plate having a first end and a second end pivotally secured between said plate member and the first portion of said mounting plate by said pivot means, and having an aperture therethrough between said first and second ends for receiving and engaging said latch pin, and a beveled surface adjacent one of its edges and adjacent the latch pin-receiving aperture for camming said latch pin outwardly as said link plate is pivoted to a towing position between said plate member and the first portion of said mounting plate.

9. A towing device as defined in claim 8 wherein said legs are movable relative to each other from a divergent position in which said frame is of a generally V-shaped configuration to a second position in which said legs extend substantially parallel to each other.

10. A towing device as defined in claim 9 and further characterized to include
   an engaging pin secured to each of said link plates adjacent the second end thereof; and
   an apertured connecting plate secured to the first end of each of said elongated legs and engaged with one of said engaging pins.

11. A towing device for interconnecting a towing vehicle with a towed vehicle comprising:
   a towing frame having a pair of elongated legs, said legs each having a first end and a second end;
   connecting means secured to the first end of each of said legs for connecting the legs to the towing vehicle, said connecting means being secured to said legs to permit movement of said legs relative to each other in a common plane; and bracket elements movably connected to the second end of each of said elongated legs for pivoting about a substantially horizontal axis, said bracket elements each including a stationary portion adapted for attachment to the towed vehicle, and a movable portion connected to the second end of the respective elongated leg and pivotable about a substantially horizontal axis for permitting horizontal and vertical components of motion by said towing frame.

References Cited

UNITED STATES PATENTS

| | | | |
|---|---|---|---|
| 2,194,087 | 3/1940 | Jager | 280—478 X |
| 2,601,992 | 7/1952 | Dillon | 280—491 |
| 2,995,386 | 8/1961 | Peterson | 280—491 |
| 3,147,027 | 9/1964 | Bronleewe | 280—491 |
| 3,281,162 | 10/1966 | Carson | 280—491 X |

LEO FRIAGLIA, *Primary Examiner.*

U.S. Cl. X.R.

280—491